US008277308B2

(12) United States Patent
Baerlocher et al.

(10) Patent No.: US 8,277,308 B2
(45) Date of Patent: Oct. 2, 2012

(54) GAMING DEVICE HAVING INDEPENDENT REEL COLUMNS

(75) Inventors: Anthony J. Baerlocher, Reno, NV (US); Bayard S. Webb, Sparks, NV (US)

(73) Assignee: IGT, Reno, NV (US)

( * ) Notice: Subject to any disclaimer, the term of this patent is extended or adjusted under 35 U.S.C. 154(b) by 1297 days.

(21) Appl. No.: 11/957,053

(22) Filed: Dec. 14, 2007

(65) Prior Publication Data

US 2008/0096670 A1 Apr. 24, 2008

Related U.S. Application Data

(63) Continuation of application No. 11/355,304, filed on Feb. 14, 2006, now Pat. No. 7,309,282, which is a continuation of application No. 10/165,260, filed on Jun. 6, 2002, now Pat. No. 7,001,274, which is a continuation of application No. 09/688,428, filed on Oct. 16, 2000, now Pat. No. 6,413,162.

(51) Int. Cl.
*A63F 13/00* (2006.01)

(52) U.S. Cl. ................ 463/21; 463/17; 463/18; 463/19; 463/20

(58) Field of Classification Search .................... 463/20, 463/42
See application file for complete search history.

(56) References Cited

U.S. PATENT DOCUMENTS 4,182,515 A 1/1980 Nemeth
4,198,052 A 4/1980 Gauselmann
4,279,422 A 7/1981 Shaw
4,344,626 A 8/1982 Wadland
4,448,419 A 5/1984 Telnaes
4,566,697 A 1/1986 Vickers
4,695,053 A 9/1987 Vazquez, Jr. et al.
4,838,552 A 6/1989 Hagiwara
4,840,382 A 6/1989 Rubin
4,874,173 A 10/1989 Kishishita
5,046,737 A 9/1991 Fienberg
5,085,436 A 2/1992 Bennett
5,102,134 A 4/1992 Smyth
5,102,137 A 4/1992 Ekiert
5,209,479 A 5/1993 Nagao et al.
5,342,047 A 8/1994 Heidel et al.
5,393,061 A 2/1995 Manship et al.

(Continued)

FOREIGN PATENT DOCUMENTS

AU 680085 7/1995

(Continued)

OTHER PUBLICATIONS

Slot Machines Article written by Reno-Tahoe Specialty, Inc. published in 1989.

(Continued)

*Primary Examiner* — Paul A. D'Agostino
*Assistant Examiner* — Ankit Doshi
(74) *Attorney, Agent, or Firm* — Neal, Gerber & Eisenberg LLP

(57) ABSTRACT

A gaming device having unisymbol display reels, wherein each symbol on a display of the gaming device represents or is included on a different reel. The structure of the paylines of the gaming device is such that the gaming device can include different reel strips having different winning symbols or different proportions of winning symbols, while still maintaining payout symbols and payout combinations that have uniform odds and uniform payouts.

24 Claims, 7 Drawing Sheets

U.S. PATENT DOCUMENTS

| | | | | |
|---|---|---|---|---|
| 5,474,294 | A | | 12/1995 | Sandeen |
| 5,569,084 | A | | 10/1996 | Nicastro et al. |
| 5,580,053 | A | | 12/1996 | Crouch |
| 5,584,764 | A | | 12/1996 | Inoue |
| 5,609,524 | A | | 3/1997 | Inoue |
| 5,611,535 | A | | 3/1997 | Tiberio |
| 5,697,843 | A | | 12/1997 | Manship et al. |
| 5,704,835 | A | | 1/1998 | Dietz, II |
| 5,722,891 | A | | 3/1998 | Inoue |
| 5,743,524 | A | | 4/1998 | Nannicola |
| 5,766,074 | A | | 6/1998 | Cannon et al. |
| 5,788,573 | A | | 8/1998 | Baerlocher et al. |
| 5,807,172 | A | | 9/1998 | Piechowiak |
| 5,848,932 | A | | 12/1998 | Adams |
| 5,882,261 | A | | 3/1999 | Adams |
| 5,931,467 | A | | 8/1999 | Kamille |
| 5,941,526 | A | | 8/1999 | Martens et al. |
| 5,976,016 | A | | 11/1999 | Moody et al. |
| 5,984,781 | A | | 11/1999 | Sunaga |
| 5,984,782 | A | | 11/1999 | Inoue |
| 6,004,207 | A | | 12/1999 | Wilson, Jr. et al. |
| 6,056,642 | A | | 5/2000 | Bennett |
| 6,059,289 | A | | 5/2000 | Vancura |
| 6,089,978 | A | | 7/2000 | Adams |
| 6,093,102 | A | | 7/2000 | Bennett |
| 6,120,378 | A | | 9/2000 | Moody |
| 6,159,096 | A | | 12/2000 | Yoseloff |
| 6,159,098 | A | | 12/2000 | Slomiany et al. |
| 6,176,487 | B1 | | 1/2001 | Eklund et al. |
| 6,190,255 | B1 | | 2/2001 | Thomas et al. |
| 6,203,429 | B1 | | 3/2001 | Demar et al. |
| 6,241,607 | B1 | | 6/2001 | Payne et al. |
| 6,413,162 | B1 | | 7/2002 | Baerlocher et al. |
| 6,464,581 | B1 | * | 10/2002 | Yoseloff et al. ................. 463/20 |

FOREIGN PATENT DOCUMENTS

| | | |
|---|---|---|
| AU | 744493 | 6/1999 |
| AU | 785004 | 4/2002 |
| EP | 0688002 | 12/1995 |
| GB | 2144644 | 3/1985 |
| JP | 408010383 | 1/1996 |
| JP | 410328351 | 12/1998 |
| JP | 02001017657 | 1/2001 |
| WO | 00/16274 | 3/2000 |
| WO | WO 00/12186 | 9/2000 |

OTHER PUBLICATIONS

Super 8 Line Game (and Description) written by IGT, available prior to 2000.

The iGame Series Brochure written by IGT, available prior to 2000.

Fey, Marshall, Slot machines—A Pictorial History of the First 100 Years, 1997, Liberty Bell Books, 5th Ed., p. 13.

Statement of Grounds and Particulars filed in support of Notice of Opposition, dated Feb. 24, 2009, Australian Patent Application No. 2005234668.

* cited by examiner

GAMING DEVICE HAVING INDEPENDENT REEL COLUMNS

PRIORITY CLAIM

This application is a continuation of and claims priority to U.S. patent application Ser. No. 11/355,304, filed Feb. 14, 2006, which is a continuation of U.S. patent application Ser. No. 10/165,260, filed Jun. 6, 2002, now U.S. Pat. No. 7,001, 274, which is a continuation of and claims priority to U.S. patent application Ser. No. 09/688,428, filed Oct. 16, 2000, now U.S. Pat. No. 6,413,162 the entire contents of which are incorporated herein.

CROSS REFERENCE TO RELATED APPLICATIONS

This application relates to the following co-pending commonly owned patent application: "GAMING DEVICE HAVING INDEPENDENT REEL COLUMNS," Ser. No. 11/326, 787.

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Referring to FIGS. 1A and 1B, which are described in detail below, a known central display device 30 is illustrated with five vertical reels 34 and a payline 56. The gaming industry standard is to provide three to five vertical reels and display three symbols per reel, as illustrated. The paylines 56, which are sets of adjacent or juxtaposed symbols that the game analyzes to determine if the game has randomly generated a winning symbol or symbol combination, typically do not include more than one symbol from each reel. Including more than one symbol from the same reel on the same payline disrupts the mathematics of the game because one random number generating device, the reel, can supply more than one winning symbol or winning symbol combination component. The implementor would thus have to consider the relative spacing of the symbols on the reel, not just the number of symbols on the reel, in determining the odds of generating any particular symbol or symbol combination.

Many known gaming devices display multiple symbols of a single reel and accordingly display multiple symbols when the reels spin. These known games typically include at least one reel having a different symbol distribution than the other reels. Different symbol distributions provide the game designer or implementor flexibility in designing winning combinations and varying payouts. Many known gaming devices include multiple paylines, such as payline 56. When the multiple paylines include more than one or all the reels of the game, the symbol distribution of each reel determines some of the game characteristics that limit the game implementor.

In an effort to provide a gaming device capable of more flexible payline layouts, manufactures have developed gaming devices displaying a plurality of columns of symbols as illustrated in FIGS. 1A and 1B, but wherein each symbol is included on a separate reel. That is, referring to the furthest right reel 34 of FIGS. 1A and 1B, the bell, the seven and the cherries each represent, are part of and are included on a separate reel. Each "unisymbol display reel" thus displays one symbol to the player on the display. In FIGS. 1A and 1B, there would be fifteen different reels if the figures included unisymbol display reels. Unisymbol display reels typically exist as simulated symbols on video monitors. IGT, the assignee of this invention, manufactures and distributes a nine reel game called 'Super 8 Race', which includes unisymbol display reels in a 3 by 3 matrix.

Referring to FIG. 3, an exploded representation of a prior art unisymbol display embodiment is illustrated having nine separate displayed symbols "A" through "I" of a central display device 30 and nine respective exploded reels 100 through 116. The reels 100 through 116 each include a single symbol (or blank) displayed on the central display device 30. A rotational arrow is also illustrated for each reel 100 through 116 indicating that any symbol on the central display device 30 can change individually.

FIG. 3 also illustrates paylines one through eight connecting the symbols. The unisymbol display reels 100 through 116 enable vertical paylines, as illustrated by paylines four, five and six because the relative spacing problems associated with vertical paylines on multisymbol display reels are inapplicable. Symbol "A" is included on a reel that is different from the reel of symbol "D", etc.

Unisymbol display reels also enable the implementor to design highly unlikely winning combinations with very large payouts, which players' desire, and which typically cannot exist on normal multisymbol display reels. For a player playing all eight paylines, for example, the implementor can create a large payout for the random generation of nine of any particular symbol, "e.g." nine "A's", one on each reel. A three by three multisymbol display reel would have to place three of the same symbols next to each other on the three separate reel strips to create the possibility of displaying nine of the same symbol. As stated above, this disrupts the mathematics of the game because the odds are dependent on the relative spacing of the symbols on the reel.

Unisymbol display reels have a drawback in comparison with multisymbol display reels. Referring again to prior art FIG. 3 and assuming that a winning combination of any three adjacent "A" symbols on a payline yields an award, the mathematics of the game dictate that each reel contains the same proportion of "A" symbols. If, for instance, the reels 100 through 114 include one "A" symbol and reel 116 includes two "A" symbols, and assuming each reel strip has ten symbols, the odds of obtaining an "A", "A", "A" combination would vary depending upon which payline the player played. That is, the odds of obtaining an "A", "A", "A" combination on paylines one, two, four, five and eight are (1/10)×(1/10)×(1/10) or 1000:1. However, the odds of obtaining an "A", "A", "A" combination on paylines three, six and seven are (1/10)×(1/10)×(2/10) or 500:1. The differing odds force the game to maintain separate payouts for the same winning combination and cause player confusion.

Another drawback arises when in a winning symbol combination such as "A", "A", "A", a necessary symbol, i.e., "A" is not included on one of the reels, e.g., reel 116. In this situation, the winning paylines one, two, four, five and eight enable the player to win the award associated with the "A", "A", "A" combination, whereas paylines three, six and seven do not. With both drawbacks, differing reel strips create payline inequities that force the gaming device implementors to place the same proportion of the same symbols on each of the reels strips. The current apparatus configuration and method for evaluating winning combinations thus severely restricts the flexibility of the design of a game having unisymbol display reels.

SUMMARY

A need exists to provide a unisymbol display reel gaming device that enables unique winning combinations having high yielding prizes, enables the implementor to employ different reel strips and enables winning combinations having uniform odds on each payline. The present invention achieves these criteria by removing either the vertical or horizontal paylines, preferably the vertical paylines, from the known unisymbol display reel gaming device.

By removing the vertical paylines and thereby including only one unisymbol display per column in any given payline, the odds of obtaining any given symbol on a unisymbol reel of a column can be different from the odds of obtaining the same symbol on a different column because each payline will include or account for the change in odds. In this way each payline will maintain the same odds of generating any particular symbol or symbol combination. The present invention in this embodiment thus includes: unisymbol display reels; horizontal or diagonal paylines or combinations thereof; and different reel strips in different columns of independent, unisymbol display reels.

Likewise, by removing the horizontal paylines and thereby including only one unisymbol display per row in any given payline, the odds of obtaining any given symbol on a unisymbol reel of a row can be different from the odds of obtaining the same symbol on a different row because each payline will include or account for the change in odds. In this way, each payline will maintain the same odds of generating any particular symbol or symbol combination. By removing the horizontal paylines, the present invention can include: unisymbol display reels; vertical or diagonal paylines or combinations thereof; and different reel strips in different rows of independent, unisymbol display reels.

The present invention also contemplates arranging the independent, unisymbol display reels in unique non-rectangular shapes. The present invention can place the independent, unisymbol display reels in any position or configuration and maintain the above mentioned design criteria as long as each different reel strip maintained by any given embodiment of the present invention appears the same number of times on each payline.

It is therefore an object of the present invention to provide a gaming device with a plurality of unisymbol display reels, which enable unique winning combinations having high yielding prizes.

It is another object of the present invention to provide a gaming device with a plurality of unisymbol display reels, different reel strips on the reels and winning symbols and symbol combinations having uniform odds on each payline.

Other objects, features and advantages of the invention will be apparent from the following detailed disclosure, taken in conjunction with the accompanying sheets of drawings, wherein like numerals refer to like parts, elements, components, steps and processes.

Additional features and advantages are described herein, and will be apparent from, the following Detailed Description and the figures.

DETAILED DESCRIPTION

Figure 1A:
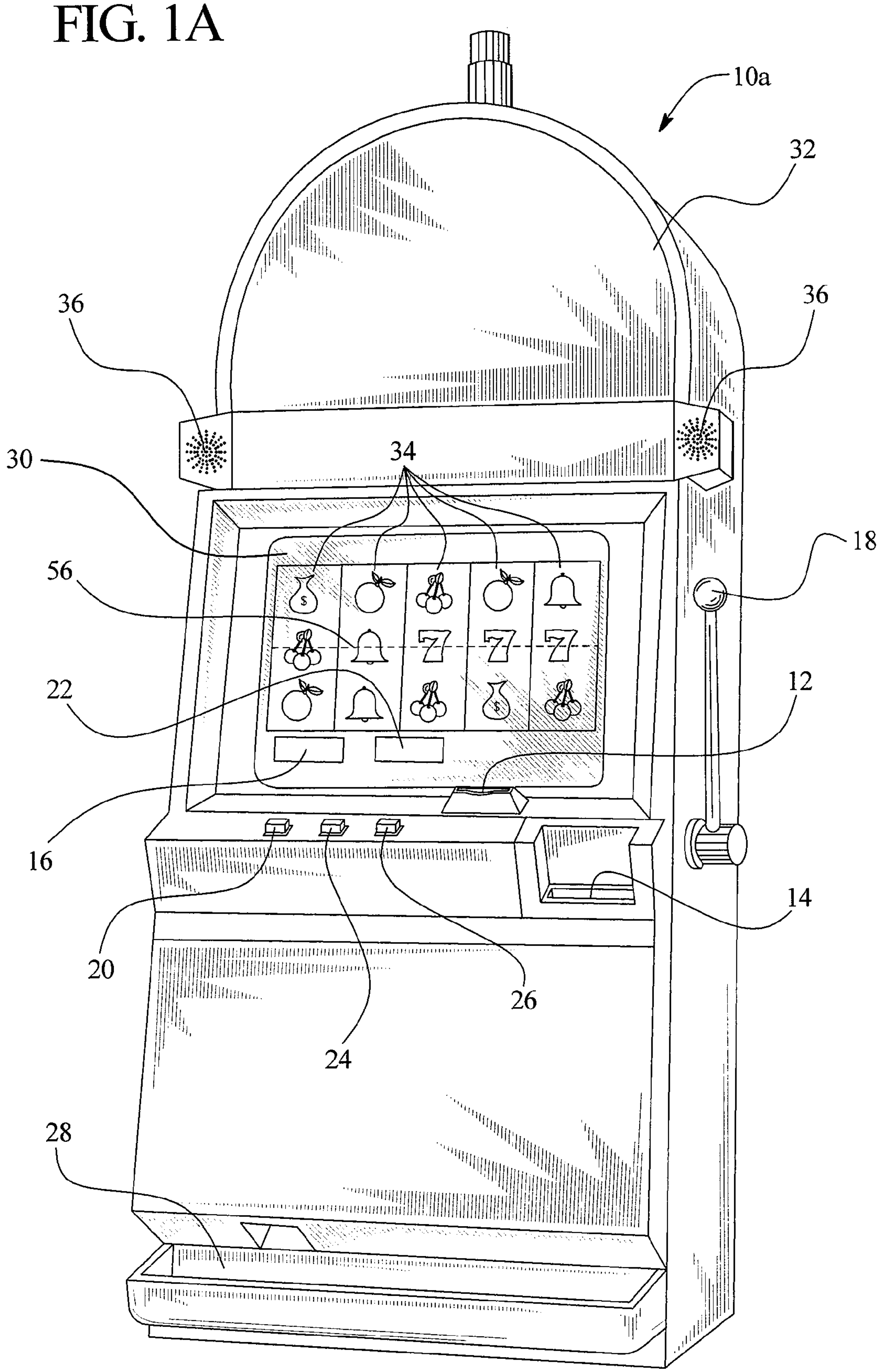
FIG. 1A is a perspective view of one embodiment of the gaming device of the present invention.
Figure 1B:
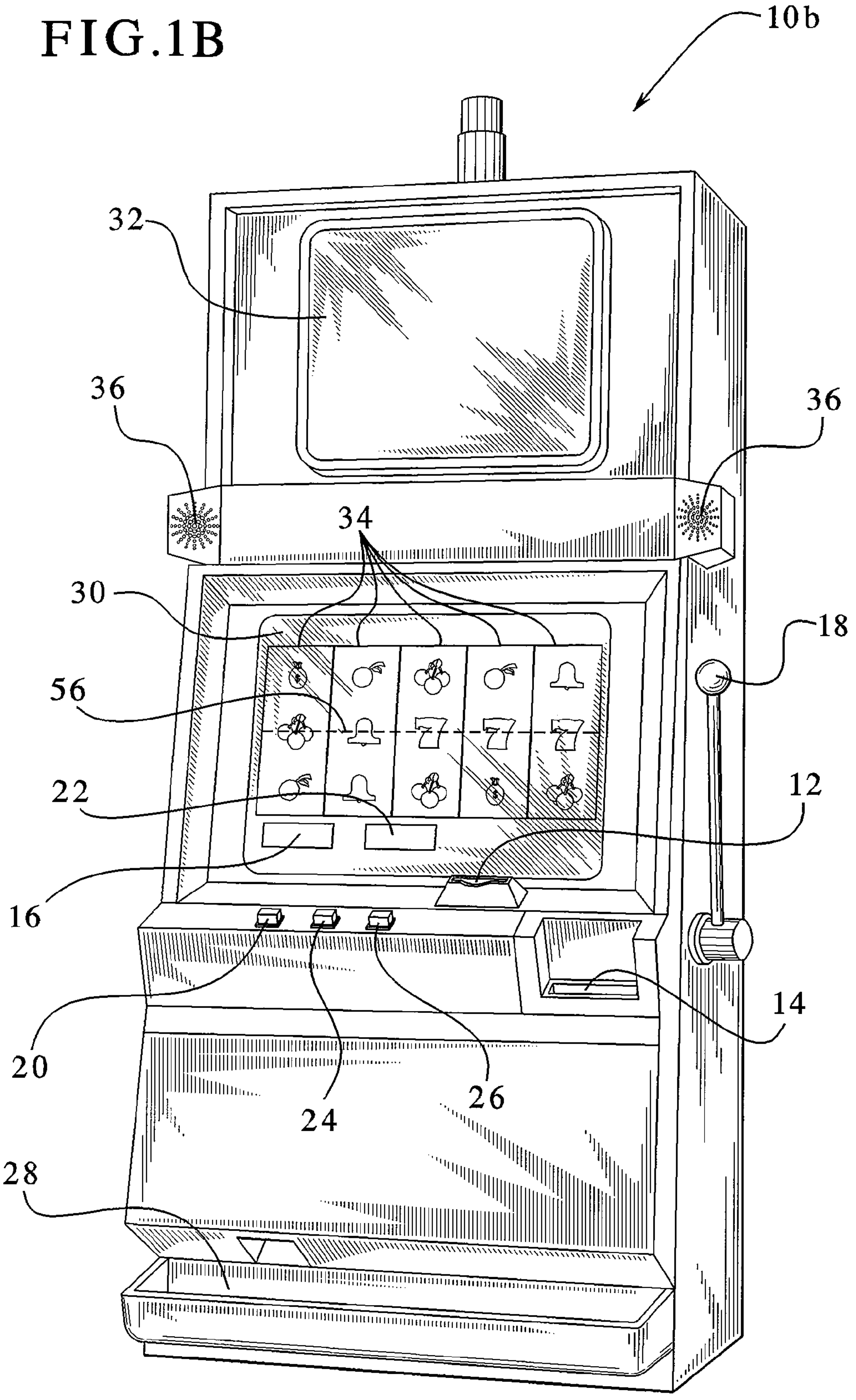
FIG. 1B is a perspective view of another embodiment of the gaming device of the present invention.

Referring now to the drawings, two embodiments of a standard multisymbol display reel or a standard unisymbol display reel gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of their bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or a ticket voucher in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player, which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit vouchers redeemable by a cashier or electronically recordable cards, which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. In a standard multisymbol display reel game, gaming device 10 preferably displays a plurality of symbols on each reel 34. The game preferably includes three to five reels 34 each displaying three symbols in mechanical or video form at one or more of the display devices. In a unisymbol display reel game, the same display includes a plurality of columns and rows of symbols belonging to different reels. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other static or dynamic display mechanism. If the reels 34 are in video form, the display device for the video reels 34 is preferably a video monitor.

Each reel 34 in a standard multisymbol display reel game displays a plurality of indicia such as bells, hearts, fruits, numbers, letters, bars or other images which preferably correspond to a theme associated with the gaming device 10. Each reel 34 in a standard unisymbol display reel game displays one of the above indicia. Furthermore, gaming device 10 preferably includes speakers 36 for making sounds or playing music.

Figure 2:
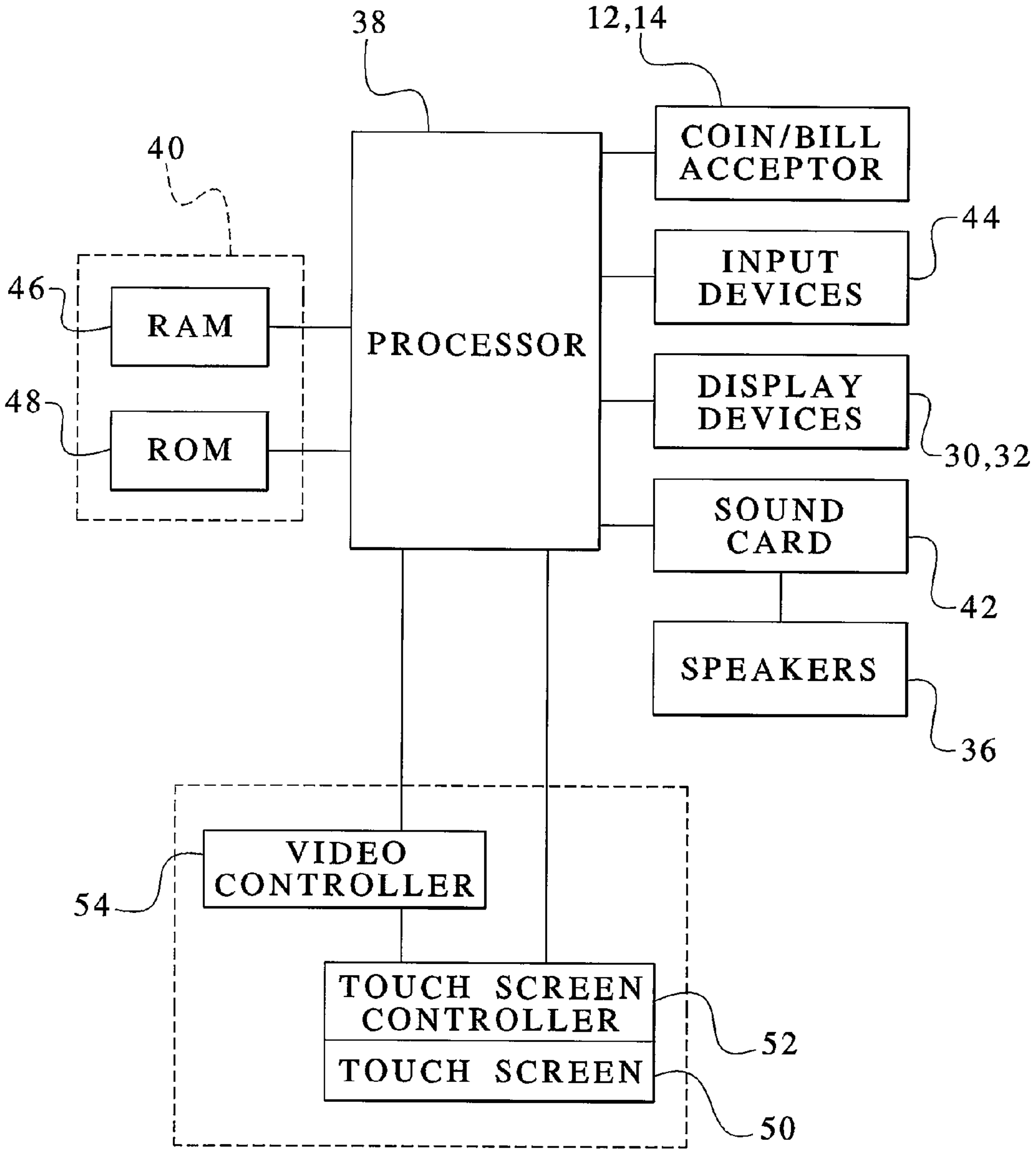
FIG. 2 is a schematic block diagram of the electronic configuration of one embodiment of the gaming device of the present invention.
Figure 3:
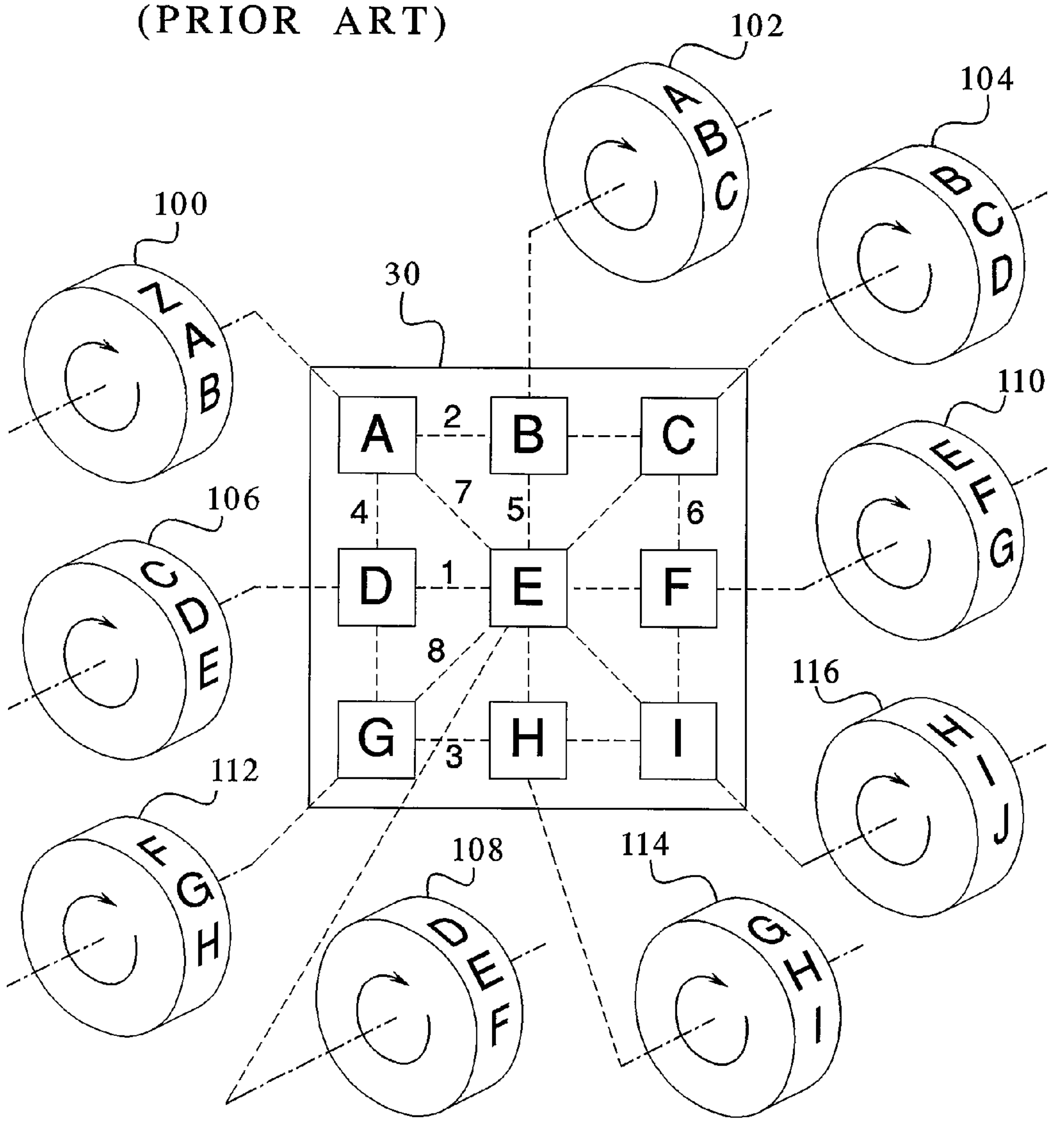
FIG.3 (PRIOR ART)
FIG. 3 is an exploded representation of a prior art unisymbol display embodiment having nine separate displayed symbols on a display device and nine respective exploded independent reels.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller".

With reference to FIGS. 1A, 1B and 2, to operate the gaming device 10 in both a standard multisymbol and unisymbol display reel game, the player must insert the appropriate amount of money or tokens at coin slot 12 or bill acceptor 14 and then pull the arm 18 or push the play button 20. The multisymbol display reels or the unisymbol display reels 34 will then begin to spin. Eventually, the reels 34 will come to a stop. As long as the player has credits remaining, the player can spin the reels 34 again. Depending upon where the reels 34 stop, the player may or may not win additional credits.

In a unisymbol display reel gaming device, the reels can spin independently, in any direction and start and stop at different times as desired by the implementor. Alternatively the independent, unisymbol display reels can spin uniformly along a column or row of the independent symbols or along a plurality of columns or rows. The independent reels can spin such that they appear exactly the same as spinning multisymbol display reels. The implementor preferably spins the independent reels such that the player can discern their independence and in such a way that maximizes the aesthetics and enjoyment from the reels.

In addition to winning credits in a base or primary game of gaming device 10, gaming device 10 can also give players the opportunity to win credits in a bonus round. This type of gaming device 10 will include a program which will automatically begin a bonus round when the player has achieved a qualifying condition in the game. This qualifying condition is typically a particular symbol combination on a plurality of unisymbol or multisymbol display reels. The gaming device 10 preferably uses a video-based central display device 30 to enable the player to play the bonus round. As illustrated in the five reel slot game shown in FIGS. 1A and 1B, the qualifying condition could be the number seven appearing on three adjacent unisymbol or multisymbol display reels 34 along a payline 56.

It should be appreciated that a bonus round of gaming device 10 can employ the method of the present invention. The primary use of the present invention is as an alternative to known multisymbol and unisymbol gaming devices, wherein the present invention enables a unique gaming system having diverse reels strips and unique winning symbol combination possibilities. The implementor can employ the present invention in a bonus game, however, especially in embodiments, described below, wherein the unisymbol display reels are not adjacent or juxtaposed as is the case in known games, but are scattered or otherwise placed in an orientation according to a theme of the bonus round.

Figure 4:
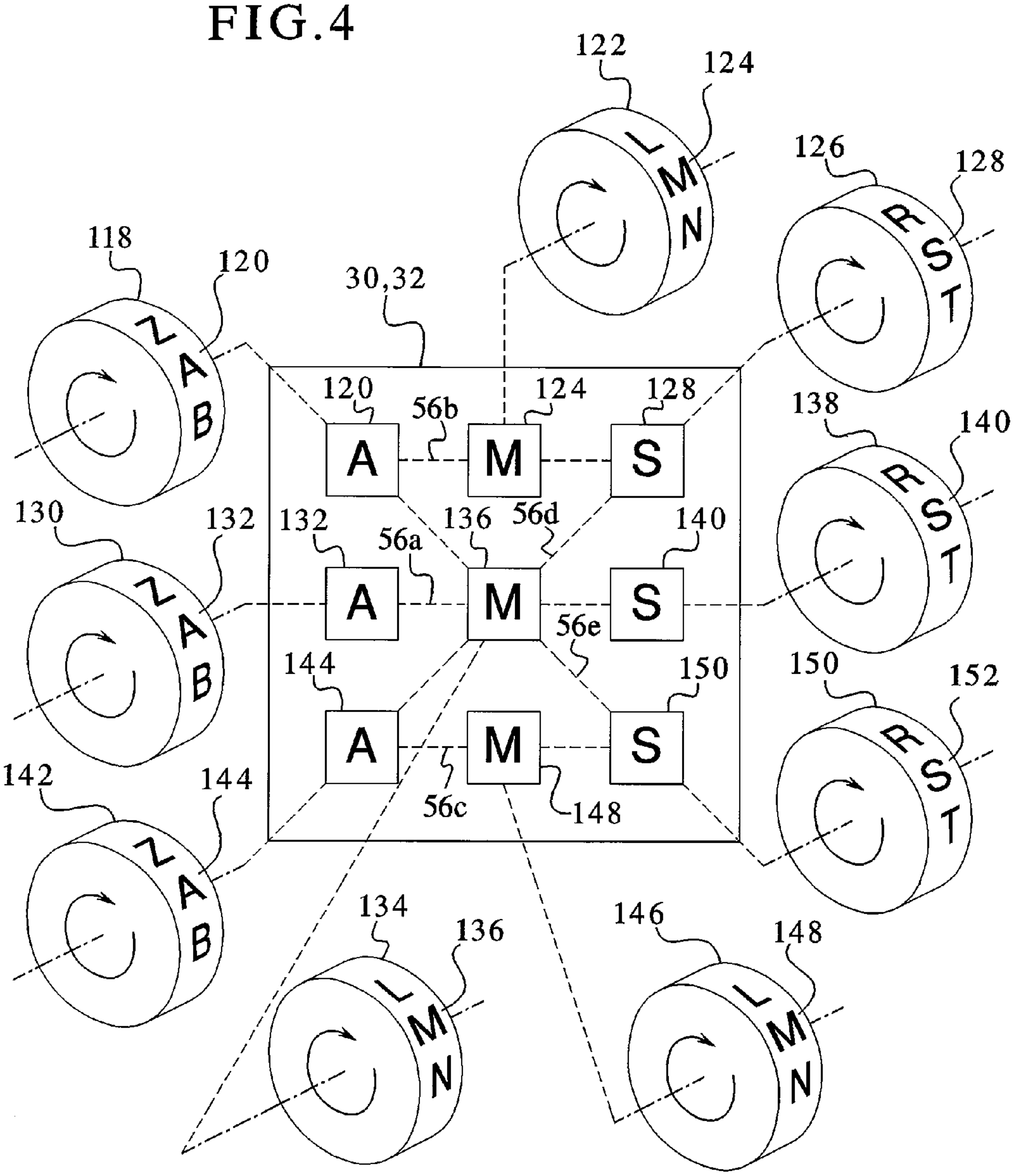
FIG. 4 is an exploded representation of an example of the preferred unisymbol display embodiment having horizontal and diagonal paylines on a display device and respective exploded independent reels.

Referring now to FIG. 4, an exploded representation of one example of the preferred unisymbol display embodiment having horizontal and diagonal paylines on a display device is illustrated along with the respective exploded independent reels. The symbols can be displayed on either the central display device 30 or the upper display device 32, as illustrated. The display devices are preferably video monitors as described above. The symbols "A", "M" and "S" are illustrated spaced apart to accentuate their independence from each other. It should be appreciated that the present invention can maintain the spacing as illustrated or in any orientation, as described below, or the present invention can maintain the symbols in the typical rectangular or square position, such as in FIGS. 1A and 1B.

FIG. 4 illustrates perspective views for three vertically juxtaposed reels 118, 130 and 142 having the same reel or proportional reel strips. Each of these reel strips displays an "A" symbol 120, 132 and 144, respectively, on one of the display devices 30 or 32. A rotational arrow is also illustrated for each reel indicating that any symbol of the reels on the display devices can change individually. The reel strips of the reels 118, 130 and 142 each have the same odds of obtaining symbols that alone or in combination with one or more symbols of other unisymbol reels yield an award. For example, each reel can include the same number of each symbol that alone or in combination yields a gaming device win. That is, the reel strips include the same number of "A" symbols, the same number of "Z" symbols, the same number of "B" symbols, etc. if they alone or in combination with other symbols yield a gaming device win. For the odds to be the same, the reel strips must also include the same overall number of symbols. The symbols do not have to be displayed in the same order. That is, each reel strip of the independent reels 118, 130 and 142 does not have to display the symbols in the order "Z", "A", "B" as illustrated. However, the present invention can provide reel strips with the same symbols in the same order.

If any of symbols "A", "B", or "C", etc. does not alone or in combination with one or more symbols of other unisymbol reels yield a gaming device win, the reel strips of reels 118, 130 and 142 can include a different number of such symbol (s). Since the symbols are "inactive", i.e., do not yield an award, increasing the number of such symbols does not increase the odds of winning any particular award. It should be appreciated, however, that the overall number of symbols on the strips of reels 118, 130 and 142 must be the same or otherwise proportional so that one reel does not become more diluted with non-winning symbols than does another reel. If, for example, neither the symbol "A" or "B" alone or in combination with one or more symbols of other unisymbol reels yields a gaming device win, the reel 118 can contain two "A" and one "B" symbols, the reel 130 can contain one "A" and two "B" symbols and the reel 142 can contain three "B" symbols without disrupting the odds and thus the payline math. Preferably, inactive symbols are "ghost" symbols, i.e., areas of the reel strip displaying no indicia. Actual symbols, such as an "A" or "B" that are inactive needlessly tend to confuse players.

The columns of the preferred embodiment can also include proportional unisymbol display reel strips. That is, if the symbol "A" is a winning symbol, the reel 118 can contain one "A" symbol and ten overall symbols. The reel 130 can contain ten "A" symbols and one hundred overall symbols. The reel 142 can contain one hundred "A" symbols and one thousand overall symbols. Proportional unisymbol displays do not disrupt the odds or the payline math. Of course, each winning symbol, including the symbol "A" must have a proportional quantity on each of the reels 118, 130 and 142 of the column. Preferably, the present invention simply provides the same reels having the same number of winning symbols.

FIG. 4 also illustrates perspective views for three different vertically juxtaposed reels 122, 134 and 146 having the same reel strips. Each of these reel strips displays an "M" symbol 124, 136 and 148, respectively, on one of the display devices 30 or 32. A rotational arrow is also illustrated for each reel indicating that any symbol of the reels on the display devices can change individually. The reel strips of the reels 122, 134 and 146 each have the same odds of obtaining symbols that alone or in combination with one or more symbols of other unisymbol reels yield an award. For example, each reel can include the same number of each symbol that alone or in combination yields a gaming device win. That is, the reel strips include the same number of "M" symbols, the same number of "L" symbols, the same number of "N" symbols, etc., if they alone or in combination yield a gaming device win. The reels also include the same overall number of symbols to maintain uniform odds. The symbols can be, but do not have to be, displayed in the same order.

FIG. 4 further illustrates perspective views for three more different vertically juxtaposed reels 126, 138 and 150 having the same reel strips. Each of these reel strips displays an "S" symbol 128, 140 and 152, respectively, on one of the display devices 30 or 32. A rotational arrow is also illustrated for each reel indicating that any symbol of the reels on the display devices can change individually. The reel strips of the reels 126, 138 and 150 each have the same odds of obtaining symbols that alone or in combination with one or more symbols of other unisymbol reels yield an award. For example, each reel can include the same number of each symbol that yields a gaming device win and the same overall number of symbols to maintain uniform odds. That is, the reel strips include the same number of "S" symbols, the same number of "R" symbols, the same number of "T" symbols, etc. if they alone or in combination yield a gaming device win. The reels must also include the same number of inactive or ghost symbols, if any, to maintain uniform odds. The symbols can be, but do not have to be, displayed in the same order.

FIG. 4 includes five paylines; three horizontal paylines 56*a*, 56*b* and 56*c* and two diagonal paylines 56*d* and 56*e*. Horizontal payline 56*a* includes the individual unisymbol display reels 130, 134 and 138. Horizontal payline 56*b* includes the individual unisymbol display reels 118, 122 and 126. Horizontal payline 56*c* includes the individual unisymbol display reels 142, 146 and 150. Diagonal payline 56*d* includes the individual unisymbol display reels 142, 134 and 126. Diagonal payline 56*e* includes the individual unisymbol display reels 118, 134 and 150.

It should be appreciated that whether the game reads left to right or right to left along any of the paylines, the game reads one randomly generated symbol from the column designated by the letter "A", one randomly generated symbol from the column designated by the letter "M" and one randomly generated symbol from the column designated by the letter "S". As long as the columns include reel strips having the same proportion of the same symbols that alone or in combination with one or more symbols from other unisymbol reels yield a gaming device win, e.g., the same number of winning symbols and the same number of overall symbols, any winning symbol or symbol combination has the same odds or likelihood of appearance upon any of the paylines.

As an example, if the reels 118, 130 and 142 each include three "A" symbols, the reels 122, 134 and 146 each include two "A" symbols and the reels 126, 138 and 150 each include one "A" symbol, and if each of the reels includes ten symbols, the odds of obtaining a winning "A", "A", "A" combination on any of the paylines are the same. That is, the odds of obtaining an "A", "A", "A" combination on any of the paylines 56*a* through 56*e* are: (3/10)×(2/10)×(1/10) or 167:1.

Figure 5:
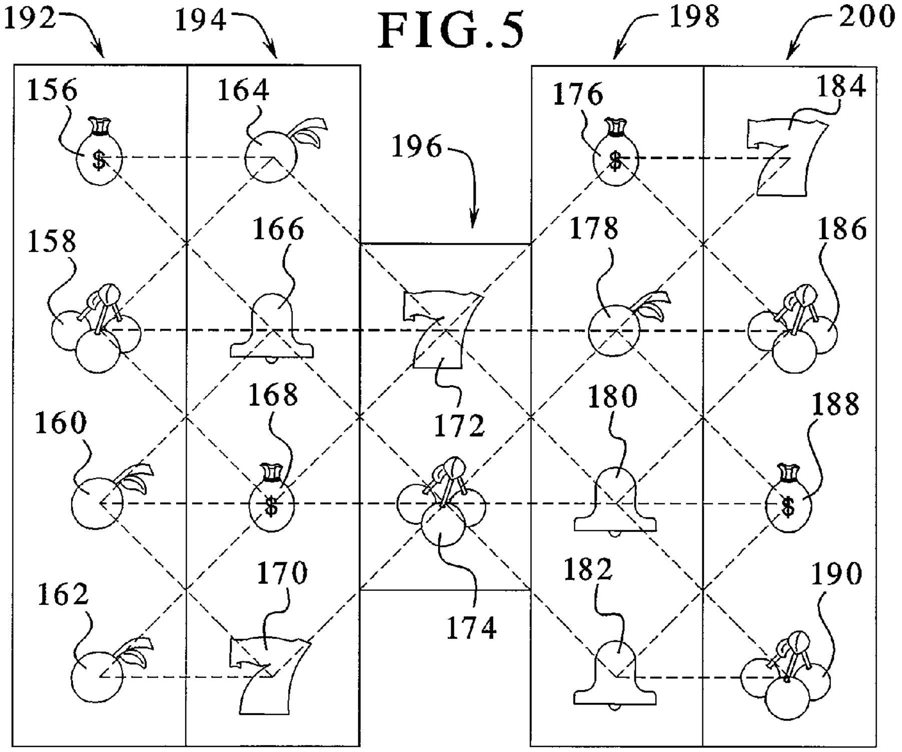
FIG. 5 is an enlarged front plan view of a display device including the preferred layout of the unisymbol display reels of the preferred horizontally analyzed embodiment of the present invention.

Referring now to FIG. 5, an enlarged front plan view of a display device 30 or 32 includes the preferred layout 154 of the unisymbol display reels of the preferred horizontally analyzed embodiment of the present invention. The preferred layout 154 includes eighteen independent unisymbol display reels 156 through 190 that are each capable of randomly generating and displaying one of a plurality of symbols.

In the column 192, the independent unisymbol display reels 156, 158, 160 and 162 each include the same proportion of the same symbols that alone or in combination with one or more symbols of other unisymbol reels yield a gaming device win. Preferably, unisymbol display reels 156, 158, 160 and 162 each include the same number of the same symbols that alone or in combination yield a gaming device win and the same overall number of symbols. Likewise, in the column 194, the reels 164, 166, 168 and 170 each preferably include the same number of the same symbols that yield a gaming device win and the same overall number of symbols. Similarly, in the column 196, the reels 172 and 174 each preferably include the same number of the same symbols that yield a gaming device win and the same overall number of symbols. Further, in the column 198, the reels 176, 178, 180 and 182 each include the same number of the same symbols that yield a gaming device win and the same overall number of symbols. And further still, in the column 200, the reels 184, 186, 188 and 190 each preferably include the same number of the same symbols that yield a gaming device win and the same overall number of symbols.

The preferred layout 154 of FIG. 5 can include up to 40 different paylines. That is, there exists at least 40 different ways to move left to right (or right to left) from column to column of the preferred layout 154, employing one symbol per column. The phantom lines extending from unisymbol reel center to unisymbol reel center illustrate a few of the many paths that the paylines can take. A column can include only one unisymbol display reel, in which case each payline of the present invention would include the single unisymbol display reel. In this regard, the preferred horizontally analyzed uniform column embodiment includes an unlimited number of shapes and is not limited to the "H" shape of the preferred layout.

Because the reel strips of the columns are at least proportional with respect to winning symbols, any winning symbol or symbol combination has the same odds or likelihood of being generated regardless of the payline analyzed. That is, each payline of the preferred layout 154 desirously has the same paytable of winning symbols and symbol combinations and the same odds or likelihood of generating the symbols or symbol combinations.

The implementor can employ up to five different reel strips in the preferred layout 154. The implementor is not bound to including each of the same symbols on each strip and can thus create many more diverse payout combinations than in known unisymbol display reel gaming devices. The preferred layout 154 also enables highly unlikely winning combinations with very large payouts due to the independent nature of the unisymbol display reels, which would not be possible or would be very difficult in known multisymbol display reel gaming devices. For instance, the implementor can create a winning combination requiring the same symbol to appear on the eighteen different reels 156 through 190. Here, it should be appreciated, the player would have to play enough paylines to cover or include all eighteen unisymbol reels 156 to 190.

Figure 6:
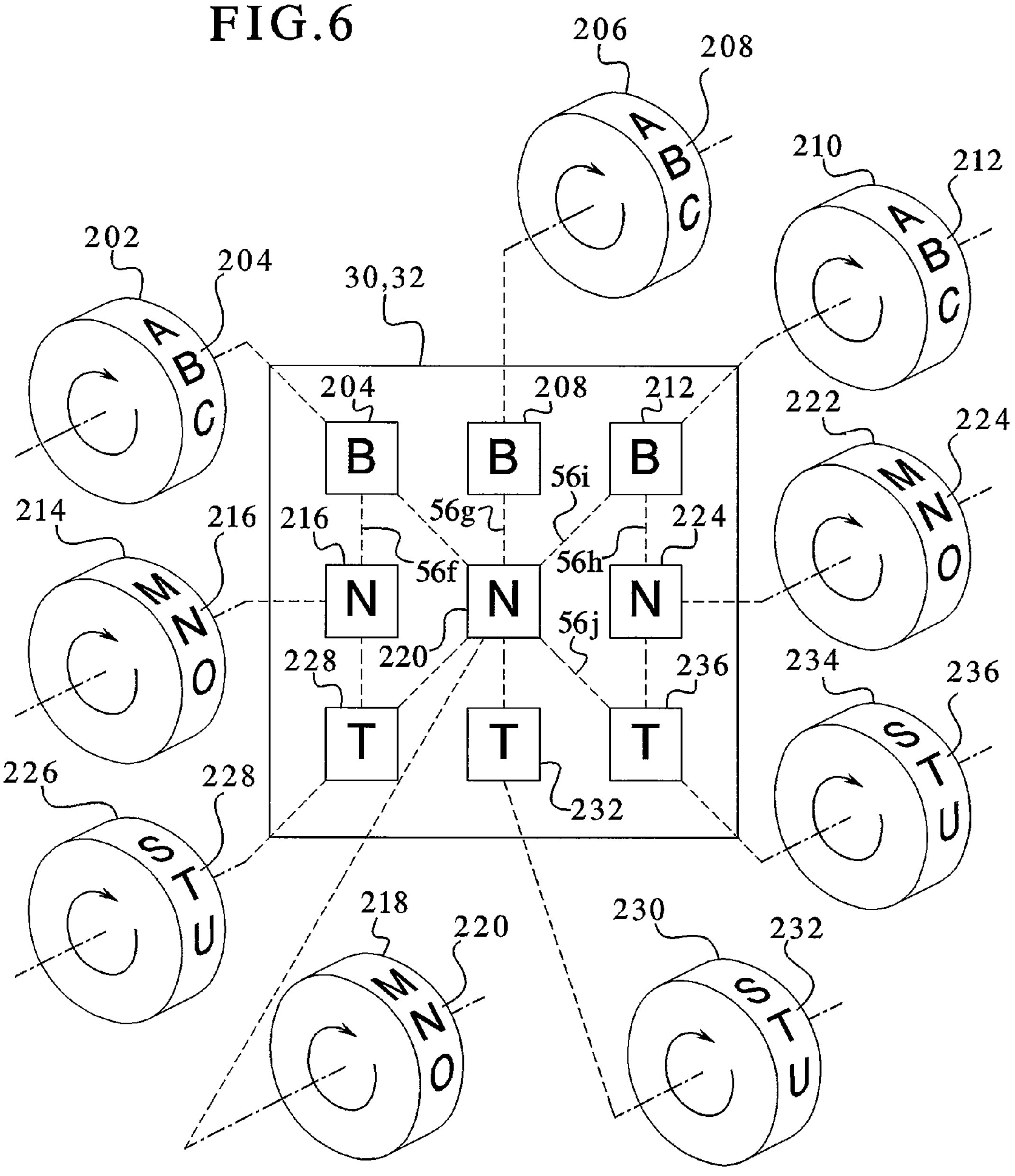
FIG. 6 is an exploded representation of an alternative unisymbol display embodiment having vertical and diagonal paylines on a display device and respective exploded independent reels.

Referring now to FIG. 6, an exploded representation of one example of an alternative unisymbol display embodiment having vertical and diagonal paylines on a display device is illustrated along with the respective exploded independent reels. The symbols can be displayed on either the central display device 30 or the upper display device 32, as illustrated. The symbols "B", "N" and "T" are illustrated spaced apart to accentuate their independence from each other. It should be appreciated that the present invention can maintain the spacing as illustrated or any orientation, as described below, or the present invention can maintain the symbols in the typical rectangular or square position, such as in FIGS. 1A and 1B.

FIG. 6 illustrates perspective views for three horizontally juxtaposed reels 202, 206 and 210 having the same reel strips. Each of these reel strips displays a "B" symbol 204, 208 and 212, respectively, on one of the display devices 30 or 32. A rotational arrow is also illustrated for each reel indicating that any symbol of the reels on the display devices can change individually. The reel strips of the reels 202, 206 and 210 each have the same odds of obtaining symbols that alone or in combination with one or more symbols of other unisymbol reels yield an award. For example, each reel can include the same number of each winning symbol. That is, the reel strips include the same number of "B" symbols, the same number of "A" symbols, the same number of "C" symbols, etc. if they alone or in combination yield a gaming device win, as well as the same number of inactive or ghost symbols. The symbols can but do not have to be displayed in the same order.

FIG. 6 also illustrates perspective views for three different horizontally juxtaposed reels 214, 218 and 222 having the same reel strips. Each of these reel strips displays an "N" symbol 216, 220 and 224, respectively, on one of the display devices 30 or 32. A rotational arrow is also illustrated for each reel indicating that any symbol of the reels on the display devices can change individually. The reel strips of the reels 214, 218 and 222 each have the same odds of obtaining symbols that alone or in combination with one or more symbols of other unisymbol reels yield an award. For example, each reel can include the same number of each winning symbol. That is, the reel strips include the same number of "N" symbols, the same number of "M" symbols, the same number of "O" symbols, etc. if they yield a gaming device win. The reels must also include the same overall number of symbols to maintain uniform odds. The symbols do not have to be displayed in the same order.

FIG. 6 further illustrates perspective views for three more different horizontally juxtaposed reels 226, 230 and 234 having the same reel strips. Each of these reel strips displays a "T" symbol 228, 232 and 236, respectively, on one of the display devices 30 or 32. A rotational arrow is also illustrated for each reel indicating that any symbol of the reels on the display devices can change individually. The reel strips of the reels 226, 230 and 234 each have the same odds of obtaining symbols that alone or in combination with one or more symbols of other unisymbol reels yield an award. Each reel can again include the same number of each symbol that yields a gaming device win and the same overall number of symbols. The symbols can be, but do not have to be, displayed in the same order.

FIG. 6 includes five paylines; three vertical paylines 56*f*, 56*g* and 56*h* and two diagonal paylines 56*i* and 56*j*. Vertical payline 56*f* includes the individual unisymbol display reels 202, 214 and 226. Vertical payline 56*g* includes the individual unisymbol display reels 206, 218 and 230. Vertical payline 56*h* includes the individual unisymbol display reels 210, 222 and 234. Diagonal payline 56*i* includes the individual unisymbol display reels 226, 218 and 210. Diagonal payline 56*j* includes the individual unisymbol display reels 202, 218 and 234.

It should be appreciated that whether the game reads top to bottom or bottom to top along any of the paylines, the game reads one randomly generated symbol from the row designated by the letter "B", one randomly generated symbol from the row designated by the letter "N" and one randomly generated symbol from the row designated by the letter "T". Because the present invention includes reel strips having the same proportion of the same symbols, any winning symbol or symbol combination has the same odds or likelihood of appearance upon any of the paylines.

Figure 7:
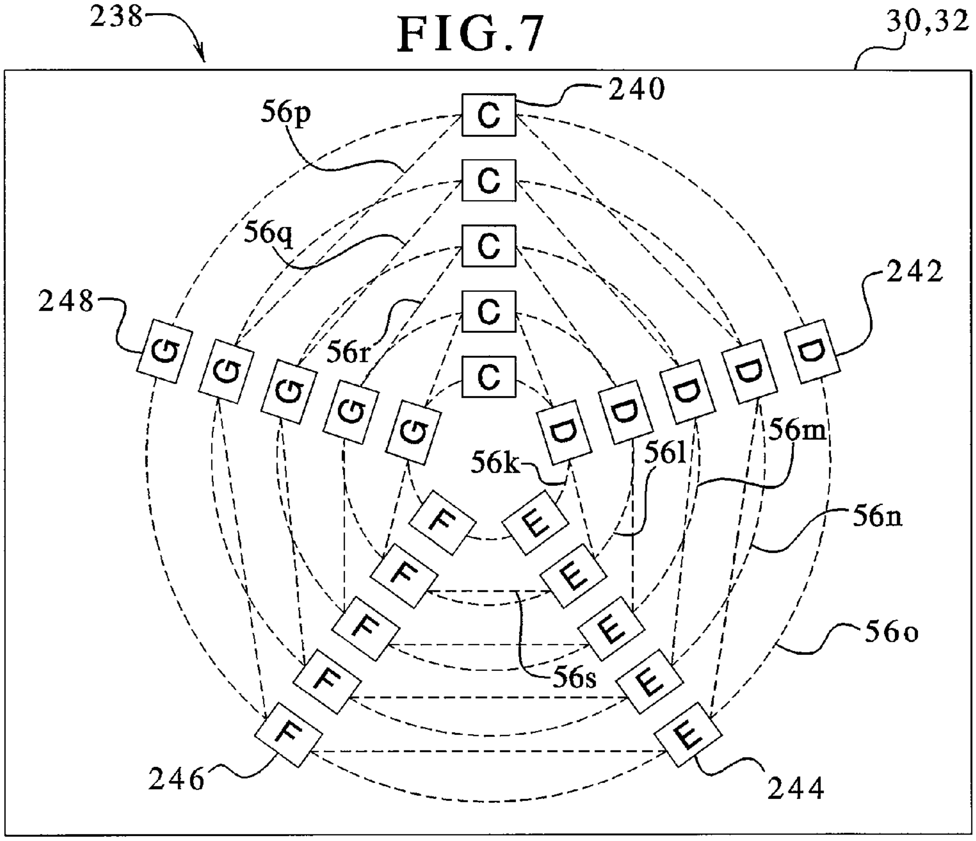
FIG. 7 is an enlarged front plan view of a display device including an alternative layout, wherein groups of unisymbol display reels are positioned along the intersections of radius lines and concentric circles.

Referring now to FIG. 7, an enlarged front plan view of a display device 30 or 32 includes an alternative layout 238 of the unisymbol display reels of the present invention, wherein groups of reels are positioned along the intersections of radius lines and concentric circles. The alternative layout 238 includes twenty five independent unisymbol display reels, each of which are included in one of five groups of unisymbol display reels 240 through 248. Each group includes reels having the same odds of obtaining symbols that alone or in combination with one or more symbols of other unisymbol reels yield an award. Each group can, for example, include the same number of the same symbols that yield an award and the same overall number of symbols.

In the group 240, the five independent unisymbol display reels each displaying the symbol "C" include the same proportion of symbols that alone or in combination with one or more symbols of other unisymbol reels yield a gaming device win. Likewise, in the group 242, the five independent unisymbol display reels each displaying the symbol "D" include the same proportion of symbols that yield a gaming device win. Similarly, in the group 244, the five independent unisymbol display reels each displaying the symbol "E" include the same proportion of symbols that yield a gaming device win. Further, in the group 246, the five independent unisymbol display reels each displaying the symbol "F" include the same proportion of symbols that yield a gaming device win. Still further, in the group 248, the five independent unisymbol display reels each displaying the symbol "F" include the same proportion of symbols that yield a gaming device win. Preferably, each reel of each group includes the same number of winning symbols and the same overall number of symbols.

The alternative layout 238 of FIG. 7 can include many different paylines. That is, there exists many ways to move clockwise or counterclockwise from group to group of the alternative layout 238, employing one symbol per group. The phantom lines extending from unisymbol reel center to unisymbol reel center illustrate a few of the many paths that the paylines such as paylines 56*k* through 56*s* can take.

Because the reel strips of the groups are proportional with respect to the symbols that alone or in combination with one or more symbols of other unisymbol reels yield a gaming device win, any winning symbol or symbol combination has the same odds or likelihood of being generated regardless of the payline analyzed. That is, each payline of the alternative layout 238 desirously has the same paytable of winning symbols and symbol combinations and the same odds or likelihood of generating the symbols or symbol combinations.

The implementor can employ up to five different reel strips in the alternative layout 238, which enables more diverse winning combinations as discussed above. The alternative layout 238 illustrates that the present invention is not limited to square or rectangular shaped unisymbol reel displays or to rows and columns of unisymbol reels. The unisymbol reels can be rotated to any angle desired by the implementor, as illustrated by the alternative layout 238, wherein the reels are rotated to be perpendicular a radius line (not shown) intersecting the corresponding circular payline, i.e., one of paylines 56*k* through 56*o*.

As illustrated by FIG. 7, the present invention contemplates a group of unisymbol reels having the same odds of producing any symbol that alone or in combination with one or more symbols of other unisymbol reels yields an award, wherein the constituent reels within the group can have any relative configuration or layout. The present invention contemplates a plurality of such groups having different reels strips, wherein the groups can have any relative configuration or layout.

The present invention thus contemplates each payline including the same number of unisymbol reels. Each payline must also include the same number of each type of unisymbol reels, wherein the type is defined by the symbols of the reel that alone or in combination with one or more symbols of other unisymbol reels yield an award. Each type of unisymbol reel must include the same proportion of award producing symbols. Preferably, each type of unisymbol reel includes the same number of said symbols and the same overall number of symbols including ghost or inactive symbols. If two unisymbol reels "U" and "V" are the only two reels of one particular type in an embodiment, the present invention contemplates a game wherein any payline includes one or the other of the reels "U" and "V". The present invention also contemplates a game wherein every payline includes both the reels "U" and "V". However, the present invention preferably does not involve a game having one payline that includes a "U" reel and another payline that includes a "U" and a "V" reel because such a game then has paylines with different odds of yielding the same winning combination.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming system comprising:

at least one input device;

at least one display device configured to display:

(a) a first column having at least X number of first unisymbol display reels, wherein X is at least three;

(b) a second column having at most Y number of second unisymbol display reels, wherein Y is at least one and less than X; and (c) a third column having at least X number of third unisymbol display reels, wherein:

(i) the second column is positioned between the first column and the third column, and (ii) at least one of:

(A) at least one of a plurality of symbols on at least two of the first unisymbol display reels, the second unisymbol display reels and the third unisymbol display reels are different, and (B) at least two of the first unisymbol display reels, the second unisymbol display reels and the third unisymbol display reels have different probabilities of displaying at least one of the plurality of symbols;

at least one processor; and at least one memory device storing a plurality of instructions, which when executed by the at least one processor, cause the at least one processor to operate with the at least one input device and the at least one display device to:

(i) cause each of the plurality of unisymbol display reels of the first column, the second column, and the third column to independently display one of a plurality of symbols on said unisymbol display reel;

(ii) determine if the displayed symbols form any winning symbol combinations;

(iii) determine any awards associated with any formed winning symbol combinations; and (iv) display any said awards.

2. The gaming system of claim 1, wherein the plurality of symbols of each of the first unisymbol display reels are the same, the plurality of symbols of each of the second unisymbol display reels are the same, and the plurality of symbols of each of the third unisymbol display reels are the same.

3. The gaming system of claim 1, wherein the proportion of the plurality of symbols relative to one another for the first unisymbol display reels, the second unisymbol display reels, and the third unisymbol display reels is different.

4. The gaming system of claim 1, wherein each of the unisymbol display reels of the first unisymbol display reels has a same probability of displaying respective symbols, each of the unisymbol display reels of the second unisymbol display reels has a same probability of displaying respective symbols, and each of the unisymbol display reels of the third unisymbol display reels has a same probability of displaying respective symbols.

5. The gaming system of claim 1, wherein the first unisymbol display reels each include a first symbol being in a first proportion relative to an overall number of symbols of each of the first unisymbol display reels and the second unisymbol display reels each include a second symbol being in a second proportion relative to an overall number of symbols of each of the second unisymbol display reels and wherein said first proportion is different than said second proportion.

6. A gaming system comprising:

at least one input device;

at least one display device configured to display:

(a) a first column having at least X number of first unisymbol display reels, wherein X is at least four;

(b) a second column having at least X number of second unisymbol display reels;

(c) a third column having at most Y number of third unisymbol display reels, wherein Y is at least two;

(d) a fourth column having at least X number of fourth unisymbol display reels; and (e) a fifth column having at least X number of fifth unisymbol display reels, wherein:

(i) the third column is positioned between the second column and the fourth column, (ii) the second column and fourth column are positioned between the first column and the fifth column, and (iii) at least one of:

(A) at least one of a plurality of symbols on at least two of the first unisymbol display reels, the second unisymbol display reels, the third unisymbol display reels, the fourth unisymbol display reels and the fifth unisymbol display reels are different, and (B) at least two of the first unisymbol display reels, the second unisymbol display reels, the third unisymbol display reels, the fourth unisymbol display reels and the fifth unisymbol display reels have different probabilities of displaying at least one of the plurality of symbols;

at least one processor; and at least one memory device storing a plurality of instructions, which when executed by the at least one processor, cause the at least one processor to operate with the at least one input device and the at least one display device to:

(i) cause each of the plurality of unisymbol display reels of the first column, the second column, the third column, the fourth column, and the fifth column to independently display one of a plurality of symbols on said unisymbol display reel;

(ii) determine if the displayed symbols form any winning symbol combinations;

(iii) determine any awards associated with any formed winning symbol combinations; and (iv) display any said awards.

7. The gaming system of claim 6, wherein the plurality of symbols of each of the first unisymbol display reels are the same, the plurality of symbols of each of the second unisymbol display reels are the same, the plurality of symbols of each of the third unisymbol display reels are the same, the plurality of symbols of each of the fourth unisymbol display reels are the same, and the plurality of symbols of each of the fifth unisymbol display reels are the same.

8. The gaming system of claim 6, wherein the proportion of the plurality of symbols relative to one another for the first unisymbol display reels, the second unisymbol display reels, the third unisymbol display reels, the fourth unisymbol display reels and the fifth unisymbol display reels is different.

9. The gaming system of claim 6, wherein each of the unisymbol display reels of the first unisymbol display reels has a same probability of displaying respective symbols, each of the unisymbol display reels of the second unisymbol display reels has a same probability of displaying respective symbols, each of the unisymbol display reels of the third unisymbol display reels has a same probability of displaying respective symbols, each of the unisymbol display reels of the fourth unisymbol display reels has a same probability of displaying respective symbols, and each of the unisymbol display reels of the fifth unisymbol display reels has a same probability of displaying respective symbols.

10. The gaming system of claim 6, wherein the first unisymbol display reels each include a first symbol being in a first proportion relative to an overall number of symbols of each of the first unisymbol display reels and the second unisymbol display reels each include a second symbol being in a second proportion relative to an overall number of symbols of each of the second unisymbol display reels and wherein said first proportion is different than said second proportion.

11. A method of operating a gaming system, the method comprising:

(a) displaying:

(i) a first column having at least X number of first unisymbol display reels, wherein X is at least three;

(ii) a second column having at most Y number of second unisymbol display reels, wherein Y is at least one and less than X; and (iii) a third column having at least X number of third unisymbol display reels, wherein:

(A) the second column is positioned between the first column and the third column, and (B) at least one of:

(I) at least one of a plurality of symbols on at least two of the first unisymbol display reels, the second unisymbol display reels and the third unisymbol display reels are different, and (II) at least two of the first unisymbol display reels, the second unisymbol display reels and the third unisymbol display reels have different probabilities of displaying at least one of the plurality of symbols;

(b) causing each of the plurality of unisymbol display reels of the first column, the second column, and the third column to independently display one of a plurality of symbols on said unisymbol display reel;

(c) determining if the displayed symbols form any winning symbol combinations;

(d) determining any awards associated with any formed winning symbol combinations; and (e) displaying any said awards.

12. The method of claim 11, wherein the plurality of symbols of each of the first unisymbol display reels are the same, the plurality of symbols of each of the second unisymbol display reels are the same, and the plurality of symbols of each of the third unisymbol display reels are the same.

13. The method of claim 11, wherein the proportion of the plurality of symbols relative to one another for the first unisymbol display reels, the second unisymbol display reels, and the third unisymbol display reels is different.

14. The method of claim 11, wherein each of the unisymbol display reels of the first unisymbol display reels has a same probability of displaying respective symbols, each of the unisymbol display reels of the second unisymbol display reels has a same probability of displaying respective symbols, and each of the unisymbol display reels of the third unisymbol display reels has a same probability of displaying respective symbols.

15. The method of claim 11, wherein the first unisymbol display reels each include a first symbol being in a first proportion relative to an overall number of symbols of each of the first unisymbol display reels and the second unisymbol display reels each include a second symbol being in a second proportion relative to an overall number of symbols of each of the second unisymbol display reels and wherein said first proportion is different than said second proportion.

16. The method of claim 11, which is provided through a data network.

17. The method of claim 16, wherein the data network is an internet.

18. A method of operating a gaming system, the method comprising:

(a) displaying:

(i) a first column having at least X number of first unisymbol display reels, wherein X is at least four;

(ii) a second column having at least X number of second unisymbol display reels;

(iii) a third column having at most Y number of third unisymbol display reels, wherein Y is at least two;

(iv) a fourth column having at least X number of fourth unisymbol display reels; and (v) a fifth column having at least X number of fifth unisymbol display reels, wherein:

(A) the third column is positioned between the second column and the fourth column, (B) the second column and fourth column are positioned between the first column and the fifth column, and (C) at least one of:

(I) at least one of a plurality of symbols on at least two of the first unisymbol display reels, the second unisymbol display reels, the third unisymbol display reels, the fourth unisymbol display reels and the fifth unisymbol display reels are different, and (II) at least two of the first unisymbol display reels, the second unisymbol display reels, the third unisymbol display reels, the fourth unisymbol display reels and the fifth unisymbol display reels have different probabilities of displaying at least one of the plurality of symbols;

(b) causing each of the plurality of unisymbol display reels of the first column, the second column, the third column, the fourth column, and the fifth column to independently display one of a plurality of symbols on said unisymbol display reel;

(c) determining if the displayed symbols form any winning symbol combinations;

(d) determining any awards associated with any formed winning symbol combinations; and (e) displaying any said awards.

19. The method of claim 18, wherein the plurality of symbols of each of the first unisymbol display reels are the same, the plurality of symbols of each of the second unisymbol display reels are the same, the plurality of symbols of each of the third unisymbol display reels are the same, the plurality of symbols of each of the fourth unisymbol display reels are the same, and the plurality of symbols of each of the fifth unisymbol display reels are the same.

20. The method of claim 18, wherein the proportion of the plurality of symbols relative to one another for the first unisymbol display reels, the second unisymbol display reels, the third unisymbol display reels, the fourth unisymbol display reels and the fifth unisymbol display reels is different.

21. The method of claim 18, wherein each of the unisymbol display reels of the first unisymbol display reels has a same probability of displaying respective symbols, each of the unisymbol display reels of the second unisymbol display reels has a same probability of displaying respective symbols, each of the unisymbol display reels of the third unisymbol display reels has a same probability of displaying respective symbols, each of the unisymbol display reels of the fourth unisymbol display reels has a same probability of displaying respective symbols, and each of the unisymbol display reels of the fifth unisymbol display reels has a same probability of displaying respective symbols.

22. The method of claim 18, wherein the first unisymbol display reels each include a first symbol being in a first proportion relative to an overall number of symbols of each of the first unisymbol display reels and the second unisymbol display reels each include a second symbol being in a second proportion relative to an overall number of symbols of each of the second unisymbol display reels and wherein said first proportion is different than said second proportion.

23. The method of claim 18, which is provided through a data network.

24. The method of claim 23, wherein the data network is an internet.

* * * * *

UNITED STATES PATENT AND TRADEMARK OFFICE

CERTIFICATE OF CORRECTION

PATENT NO. : 8,277,308 B2
APPLICATION NO. : 11/957053
DATED : October 2, 2012
INVENTOR(S) : Anthony J. Baerlocher et al.

It is certified that error appears in the above-identified patent and that said Letters Patent is hereby corrected as shown below:

Column 13, in Claim 1, Line 12, replace “a plurality” with --the plurality--.
Column 13, in Claim 3, Line 25, replace “the proportion” with --a proportion--.
Column 13, in Claim 6, Line 61, between “and” and “fourth” insert --the--.
Column 14, in Claim 6, Line 20, replace “a plurality” with --the plurality--.
Column 14, in Claim 8, Line 35, replace “the proportion” with --a proportion--.
Column 15, in Claim 11, Line 17, replace “a plurality” with --the plurality--.
Column 15, in Claim 13, Line 29, replace “the proportion” with --a proportion--.
Column 16, in Claim 18, Line 1, between “and” and “fourth” insert --the--.
Column 16, in Claim 18, Line 21, replace “a plurality” with --the plurality--.
Column 16, in Claim 20, Line 36, replace “the proportion” with --a proportion--.

Signed and Sealed this
Fifth Day of March, 2013

Teresa Stanek Rea
*Acting Director of the United States Patent and Trademark Office*